United States Patent
Strutt et al.

(10) Patent No.: US 9,368,820 B2
(45) Date of Patent: Jun. 14, 2016

(54) METASTABLE CERAMIC FUEL CELL AND METHOD OF MAKING SAME

(71) Applicants: Peter R. Strutt, Storrs, CT (US); Bernard H. Kear, Whitehouse Station, NJ (US)

(72) Inventors: Peter R. Strutt, Storrs, CT (US); Bernard H. Kear, Whitehouse Station, NJ (US)

(73) Assignee: NANO CELL SYSTEMS, INC., Guilford, CT (US)

(*) Notice: Subject to any disclaimer, the term of this patent is extended or adjusted under 35 U.S.C. 154(b) by 564 days.

(21) Appl. No.: 13/679,507

(22) Filed: Nov. 16, 2012

(65) Prior Publication Data

US 2013/0143144 A1    Jun. 6, 2013

Related U.S. Application Data (63) Continuation of application No. 10/837,517, filed on Apr. 30, 2004, now Pat. No. 8,334,079.

(51) Int. Cl.
| | |
|---|---|
| *H01M 8/10* | (2006.01) |
| *H01M 4/86* | (2006.01) |
| *H01M 4/90* | (2006.01) |
| *H01M 8/12* | (2016.01) |

(52) U.S. Cl.
CPC .......... *H01M 8/1016* (2013.01); *H01M 4/8621* (2013.01); *H01M 4/8652* (2013.01); *H01M 4/9033* (2013.01); *H01M 4/9066* (2013.01); *H01M 8/1253* (2013.01); *H01M 8/1286* (2013.01); *Y02E 60/521* (2013.01); *Y02E 60/525* (2013.01)

(58) Field of Classification Search
None
See application file for complete search history.

(56) References Cited

U.S. PATENT DOCUMENTS

| | | | | |
|---|---|---|---|---|
| 5,543,239 | A | * 8/1996 | Virkar | C04B 35/01 429/304 |
| 8,334,079 | B2 | * 12/2012 | Strutt | H01M 4/8621 429/480 |
| 2002/0098406 | A1 | * 7/2002 | Huang et al. | 429/44 |
| 2005/0244693 | A1 | * 11/2005 | Strutt | H01M 4/8621 429/480 |

* cited by examiner

*Primary Examiner* — Scott J Chmielecki
(74) *Attorney, Agent, or Firm* — Troutman Sanders LLP; Ryan A. Schneider; Troy S. Kleckley (57) ABSTRACT

A solid oxide fuel cell has anode, cathode and electrolyte layers each formed essentially of a multi-oxide ceramic material and having a far-from-equilibrium, metastable structure selected from the group consisting of nanocrystalline, nanocomposite and amorphous. The electrolyte layer has a matrix of the ceramic material, and is impervious and serves as a fast oxygen ion conductor. The electrolyte layer has a matrix of the ceramic material and a dopant dispersed therein in an amount substantially greater than its equilibrium solubility in the ceramic matrix. The anode layer includes a continuous surface area metallic phase in which electron conduction is provided by the metallic phase and the multi-oxide ceramic matrix provides ionic conduction.

16 Claims, 9 Drawing Sheets

Fig.9 planar interface　　cellular interface　　dendritic interface
(no segregation)　(some segregation)　(gross segregation)

METASTABLE CERAMIC FUEL CELL AND METHOD OF MAKING SAME

CROSS-REFERENCE TO RELATED APPLICATION

This application is a continuation of U.S. patent application Ser. No. 10/837,517 filed on 30 Apr. 2004, entitled Metastable Ceramic Fuel Cell and Method of Making Same, which is hereby incorporated by reference in its entirety as if fully set forth below.

BACKGROUND OF THE INVENTION

This invention relates generally of plasma spray deposition of nanostructured and amorphorus ceramic coatings, and, more particularly, to the deposition of thick films in solid oxide fuel cell (SOFC) stack assemblies produced by such plasma spray depositions.

Various techniques are known for producing and consolidating metastable oxide-ceramic powders to obtain bulk materials with nanocrystalline or nanocomposite structures. In one method, metastable nano-sized particles of single component oxides, prepared by vapor condensation are consolidated by high pressure sintering to form nanocrystalline products. In another method, metastable micro-sized particles of multi-component oxides, prepared by melt quenching, are consolidated by pressure assisted sintering to form nanocomposite products. Another technique is to plasma spray nanostructured coatings, including metal-metal, metal ceramic and ceramic-ceramic systems, primarily for wear and thermal barrier applications. Furthermore, there are techniques for using liquid solutions, particle slurries, and fine particle aggregates as feed materials in plasma spraying.

An important distinction from the prior art is the use of rapid quenching methods to obtain far from equilibrium or metastable structures in the spray deposited materials. The methods involve feeding fine particles or aerosols into high enthalpy DC- or RF-plasma torches, preferably with axial feed systems, followed by rapid quenching of the resulting homogeneous particles on chilled substrates to form uniform metastable deposits.

Materials produced by these processes have a variety of applications, including medical devices. However, certain characteristics of the materials, such as their non-uniformity, have limited their commercial use.

It is known to make solid oxide fuel cells (SOFCs) from porous ceramic or composite electrodes and a dense ceramic electrolyte. However, such fuel cells have not achieved wide commercial success in view of the cost of manufacture and the high operating temperatures that are required for use. It would be useful to develop solid oxide fuel cells that can be manufactured economically and can be operated at lower temperatures than prior known fuel cells.

Accordingly, it is an object of the present invention to provide a novel method for making nanostructured and amorphous solid-oxide fuel cells.

Another object of the invention is to provide such fuel cells having enhanced oxygen ion transport and increased electrochemical activity as compared to prior known structures.

Another object of the invention is to provide electrolyte and electrode layers with desired far from equilibrium and metastable structures.

Yet another object of the invention is to provide a novel method of economically producing such fuel cells in large quantities.

Another object is to provide such fuel cells with improved efficiency.

SUMMARY OF THE INVENTION

It has now been found that the foregoing and related objects may be readily attained in a solid oxide ceramic fuel cell having anode, cathode and electrolyte layers each formed essentially of a multi-oxide ceramic material. Each of the layers has a far-from-equilibrium, metastable structure selected from the group consisting of nanocrystalline, nanocomposite and amorphous. The electrolyte layer has a matrix of the ceramic material which is impervious, and serves as a fast oxygen ion conductor.

Preferably, the multi-oxide ceramic material of the electrolyte layer is yttria-stabilized zirconia, and the matrix has dispersed therein at least one dopant. The dopant is dispersed in the matrix in an amount substantially greater than its equilibrium solubility in the ceramic material matrix.

The structure of the electrolyte layer minimizes (i) vacancy-vacancy, (ii) vacancy dopant, and (iii) dopant-dopant ordering to minimize restriction of oxygen ion mobility.

Desirably, the dopant introduces elastic strain to counteract electrostatically-induced ordering.

Preferably, the anode layer is porous and includes a continuous surface area metallic phase in which electron conduction is provided by the metallic phase and the multi-oxide ceramic matrix provides ionic conduction. Desirably, the structure of the metallic phase is nanocrystalline, and the structure of the multi-oxide ceramic matrix is nanocrystalline.

Generally, the porous cathode layer comprises a multi-oxide ceramic material which provides mixed ionic and electron conduction. Desirably, the porous cathode layer is a composite structure in which one multi-oxide continuous ceramic phase provides electron conduction and another multi-oxide continuous ceramic phase provides ionic conduction. Preferably, the electrolyte layer has a graded interface with the anode and cathode layers, and both of the anode and cathode layers are porous to permit diffusion.

In making a solid oxide fuel cell, a fully molten multi-oxide ceramic material plasma is sprayed onto a substrate. The sprayed molten material is instantaneously quenched to form a first layer of far-from-equilibrium, metastable structure selected from the group consisting of nanocrystalline, nanocomposite and amorphous. In one procedure, the multi-oxide ceramic material provides a conductive electrolyte layer, and the multi-oxide ceramic material of the electrolyte layer contains at least one dopant dispersed therein and in an amount substantially greater than its equilibrium solubility in the ceramic matrix.

The dopant is preferably a mixture of an oxide of at least one of the lanthanide group elements (Ce, Tb and Er) and at least one other oxide selected from the group consisting of $Y_2O_3$, $Sc_2O_3$, $B_2O_3$, $Al_2O_3$, $Ga_2O_3$, $In_2O_3$, BeO, MgO, CaO, SrO, BaO.

In another procedure, there are further steps of plasma spraying onto the first mentioned layer a second fully molten multi-oxide ceramic material and instantaneously quenching that sprayed molten material to form an electrolyte layer which has a far-from-equilibrium, metastable structure selected from the group consisting of nanocrystalline, nanocomposite and amorphous. The first mentioned ceramic material contains a metallic component to produce an anode layer including a high surface area metallic phase in which electron conduction is provided in the metallic phase and the ceramic matrix provides ionic conduction.

Another procedure involves the additional steps of spraying onto the second mentioned layer a third fully molten multi-oxide ceramic material and instantaneously quenching the sprayed material to form a third layer which is the other of the group consisting of a cathode layer and an anode layer, to form a far-from-equilibrium, metastable structure selected from the group consisting of nanocrystalline, nano-composite and amorphous.

BRIEF DESCRIPTION OF THE DRAWINGS

FIGS. 9a-9c diagrammatically illustrate the interfaces for layers formed under such conditions;

DETAILED DESCRIPTION OF THE PREFERRED EMBODIMENT

The present invention employs the use of far-from-equilibrium plasma processing methods to fabricate novel metastable electrolyte and electrode materials, with nanocrystalline, nanocomposite or amorphous structures. Such metastable materials: (1) enhance oxygen-ion transport through the impervious electrolyte material; (2) increase electrochemical activity of the porous electrode materials; and (3) facilitate oxygen-ion transport across the assembled stack by functionally grading the electrolyte/electrode interfaces.

More generally, the invention applies to the field of plasma spray deposition of ceramic coatings, but with the emphasis on its applicability to the fabrication of thick film solid-oxide fuel cell (SOFC) stack materials. An important distinction from the prior art is the use of rapid quenching methods to obtain far-from-equilibrium or metastable structures in the spray deposited materials. The methods involve feeding fine particles or aerosols into high enthalpy DC- or RF-plasma torches, preferably with axial feed systems, followed by rapid quenching of the resulting homogeneous particles on chilled substrates to form uniform metastable deposits.

Prior known techniques for fabricating SOFC stack materials typically employ processing methods that generate near-equilibrium structures. For example, in one reported case, J. Liu and S. A. Barnett, Solid State Ionics, 158 (2003) 11, a porous multioxide (LSM) cathode and composite anode (YSZ—Ni) are made from commercial powders. Processing of these materials and the YSZ electrolyte layer involve particle sintering treatment at temperatures in the 1100-1400° C. for several hours. Such a fabrication route, although a technical success, is not cost effective because of the time involved and the high energy consumption.

In contrast, the present invention uses of melt quenching and vapor condensation methods as effective means to fabricate metastable thick film electrolyte and electrode materials. These materials have nanocrystalline, nanocomposite, or amorphorus structures. A specific case is the YSZ-base electrolyte, where metastable processing produces materials with superior ionic conductivity, such as those containing $Sc_2O_3$ and $In_2O_3$. Such metastable materials: (1) promote bulk diffusion through the excess free volume in the amorphous state: (2) promote grain boundary diffusion via the high density of grain boundaries in the nanocrystalline state; (3) achieve high concentrations of dopants, such as rare earth oxides, which are relatively insoluble under normal conditions; (4) suppress ordering and clustering effects in the metastable structure, which enhances the transport of oxygen-ion vacancies.

Another innovation is the production of metastable materials by melting or vaporizing fine particles or aerosols in a high enthalpy DC- or RF-plasma torch, followed by rapid quenching and deposition on a chilled substrate to form a metastable deposit. Both DC- and RF-plasma systems can be operated using conventional aggregated feed particles, which are typically about 30-50 microns in size. Use of an axial feed system is preferred in order to optimize the homogeneity of deposits which is also increased when the feed particles are composed of fine particle aggregates, with particle size of the constituent phases being less than 0.5 micron. When the particle aggregates are melted, diffusion distances in the liquid state are small, so that melt homogenization occurs rapidly. In forming metastable deposits, the spray parameters can be adjusted to yield a porous or dense deposit.

Use of these techniques will produce a new type of solid-oxide fuel cell (SOFC) stack in which the thick film electrode and electrolyte materials are composed of highly supersaturated metastable phases, with nanocrystalline, nanocomposite or amorphous structures.

As used herein "supersaturation" refers to a state where specific dopants are dissolved in the atomic lattice to a level exceeding their equilibrium concentration level.

"Nanocrystalline" and "nanocomposite" materials in accordance with this invention, are comprised of crystalline monogram or multigrain structures with an average grain diameter of 2-100 nanometers.

The metastable materials are produced by plasma spray technology utilizing novel melt quenching and vapor condensation methods. In both cases, previously melt homogenized powders are the preferred feed materials for spray deposition of the SOFC stack materials because this ensures the formation of completely uniform metastable deposits. When incorporated in a typical thick film SOFC stack design, the spray-deposited metastable materials enhance ionic conductivity and catalytic activity, thus enabling efficient cell operation at intermediate temperatures.

An integrated manufacturing process is provided for the cost-effective fabrication of planar SOFC stacks based upon the materials processing advances described herein. An important benefit derived from this new manufacturing route is the flexibility afforded in control of composition and the metastability of the stack materials which enable the properties to be tailored to the performance requirements of a specific SOFC design.

The present invention has the potential to reduce manufacturing costs by integrating the processing steps in a continuous operation that facilitates computer controlled automation. Moreover, the high temperature particle sintering treatment, which is commonly used in conventional processing, is eliminated because particle melting, homogenizing, quenching and shaping are accomplished in a single plasma spray deposition operation.

Generally stated, an important aspect of the invention derives from the condition that fuel cell use depends upon an economic feasibility of producing and operating the fuel cells. The present invention produces new types of nanostructured and amorphous materials which are formed into layers. Such layered deposits can be used for various purposes and are particularly useful for making electrodes and electrolytes for fuel cells. The fuel cells made by the method of the invention have enhanced catalytic activity which enables the cells to perform well at lower temperatures than is possible with the known prior fuel cells. The use of lower temperatures enables lower cost base materials to be used for interconnects and manifolds, thereby reducing the production cost for the fuel cells.

Figure 1:
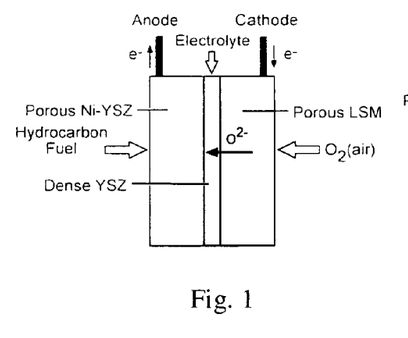
FIG. 1 schematically illustrates a prior art thick film solid oxide fuel cell.

Referring now to the attached drawings, FIG. 1 schematically shows a typical state-of-the-art thick-film SOFC stack. It comprises a porous LSM cathode, an impervious yttria-stabilized $ZrO_2$ (YSZ) electrolyte, and a porous Ni—YSZ anode. The LSM ($La_{1-x}Sr_xMnO_3$) cathode catalyses the dissociation of oxygen (air) into oxygen ions. These ions pass through the impervious YSZ electrolyte to react at the anode with the fuel (natural gas or propane). Energy is generated when electrons created at the anode flow through the external circuit to the cathode.

Figure 2:
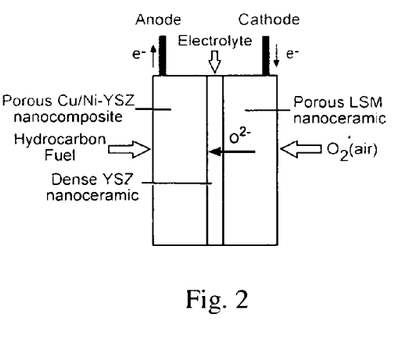
FIG. 2 schematically illustrates a thick film solid oxide fuel cell embodying the present invention.

FIG. 2 shows one embodiment of a ceramic fuel cell stack design embodying the present invention, that which incorporates highly supersaturated metastable phases as electrolyte and electrode layers. More particularly, it comprises a cathode formed from a nanoporous LSM nanoceramic material, a dense metastable YSZ electrolyte, and an anode formed from a nanoporous Cu/Ni—YSZ metastable composite. The layers of this fuel cell stack are formed by novel melt quenching or vapor condensation methods utilizing previously melt homogenized and densified particles as the feed material. The latter ensures that the spray deposited thick films or layers have completely uniform metastable structures, thus enabling superior cell performance at intermediate temperatures. Optimization of spray parameters, such as stand-off distance between plasma torch and substrate, is important to the fabrication of such metastable structures. Spray parameters can be adjusted to grade the composition, structure and porosity of the electrolyte and electrode materials.

Throughout SOFC development considerable effort has been expended in evaluating the performance of a variety of materials and compositions. The present approach marks an evolutionary step by exploiting the unique properties of highly supersaturated nanocrystalline, nanocomposite or amorphous materials in SOFC stack design. Most importantly, the new materials promote faster electrochemical reactions by virtue of enhanced catalytic activity and faster transport of negative charge carriers (ions). The combined effect is to substantially reduce the operating temperature of the SOFC. From the design viewpoint, an operating temperature of 600° C., in contrast to 800° C. and above, would constitute an important achievement since stainless steel rather than more expensive high temperature alloys may be used for interconnects and manifolds.

As emphasized by B. C. H. Steele and A. Heinzel, in Nature, 414 (2001) 345, in an optimal SOFC design, the combined area-specific resistivity (ASR) of the thick film components of the cell should be <0.5 $\Omega cm^2$ and ideally ~0.1 $\Omega cm^2$. This criterion sets the maximum allowable thickness for the electrolyte material at about 10-15 µm. The thickness limits imposed on anode and cathode materials are less stringent, but preferably should be no greater than about 30 µm. When an SOFC satisfies these requirements, practical power densities as high as 1 kW/kg or 1 $kW/dm^3$ are achievable. Such high power densities are also important because they reduce material costs/kW of power output. A practical SOFC system incorporates a multiplicity of cells, connected in series, and supported on a suitable substrate.

Materials Design

Figure 3A:
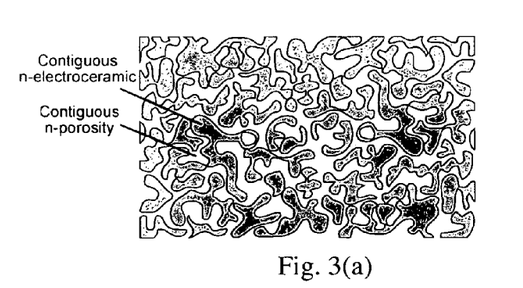
FIG. 3(a) schematically illustrates a nanostructured material having a single contiguous phase.

The compositions and morphologies of electrolyte and electrode materials used in a SOFC stack are based on an extensive body of literature on cell design and catalyst materials. The potential of oxide-ceramics as potent catalysts stems from original work by R. J. H. Voorhoeve, J. P. Remeika, P. E. Freeland, and B. T. Matthias; reported in Science, 177, (1972) 353. They reported that perovskite-type oxides ($ABO_3$) showed a high catalytic activity comparable to that of platinum-base catalysts. The perovskite oxide, $La_{1-x}Sr_xMnO_3$ (LSM), serving as the cathode material in FIG. 2, has a porous skeletal structure, FIG. 3, which facilitates passage of oxygen through the material and transport of oxygen ions and electrons though the continuous LSM phase. An important consequence of the fine scale structure of this phase is that oxygen reduction occurs at a large number of active sites, which contributes greatly to overall fuel cell efficiency. The potential of more complex oxides has been discussed by I. Taniguchi, R. C. Landschoot and J. Schoonman; in Solid State Ionics, 156, (2003) 1. A case in point is $La_{1-x}Sr_xCo_{1-y}Fe_yMnO_3$, which is susceptible to the formation of an amorphous structure. The cathode also can include nanostructured or amorphous YSZ (which doped) where the constituent LSM-YSZ phases form an interconnected or bicontinuous structure, with open porosity. The continuous LSM phase has a high surface area and serves as the catalyst and electronic conductor and the continuous YSZ phase serves as a fast oxygen-ion conductor.

Figure 4:
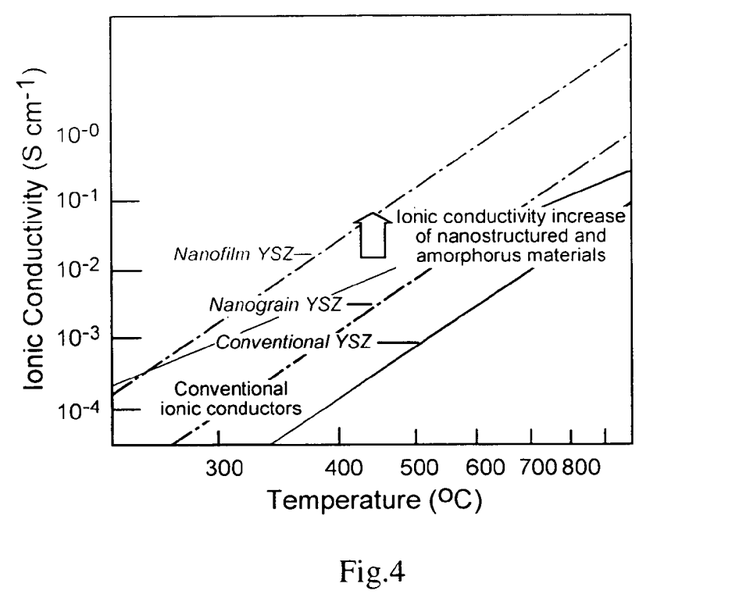
FIG. 4 is a graph showing the relationship between ion conductivity and temperature for a nanostructured material as compared with conventional ionically conductive materials.

Another feature of the fuel cell shown in FIG. 2 is the thin (~15 μm) electrolyte layer, which is composed of an impervious YSZ phase. The high density is required to preclude "crossover" of the reactants and only permit diffusion of oxygen ions. The use of a thin YSZ layer to minimize the voltage drop across the electrolyte has been recommended by C. K. L. Choy, S. Carojrochkul, and B. C. H. Steele, in Solid State Ionics 96 (1997), 49; by B. C. H. Steele and J. Mater in Science 36 (2001), 1053, and by B. C. H. Steele in "Oxygen Ion and Mixed Conductors and Their Technological Applications" edited by H. L. Tuller et al., Kluwer Academic Press Publishers, Netherlands (2000), p. 423. Because of the low ionic conductivity of YSZ, this is a critical design parameter. However, as is shown by H. L. Tuller in Solid State Ionics, 131, (2000), 143, grain boundary diffusion significantly increases ionic conductivity, as graphically illustrated in FIG. 4. This provides access for the first time to operating temperatures as low as 600° C. Even greater benefits in cell performance are anticipated when a multicomponent YSZ-base oxide ceramic has an amorphous or glassy structure as shown in FIG. 4.

Figure 3B:
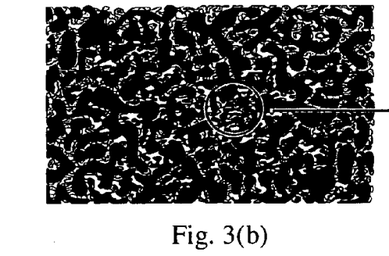
FIG. 3(b) schematically illustrates a nanostructured material having two contiguous phases.
Figure 3C:
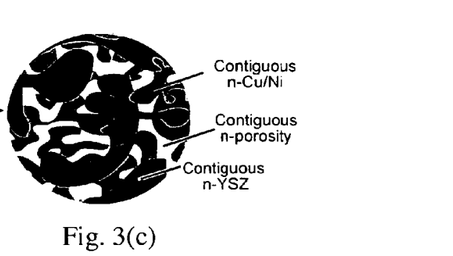
FIG. 3(c) is an enlarged view of the encircled portion of FIG. 3(b); showing two contiguous phases and also showing porosity.

Finally, in FIG. 2, the porous Ni—YSZ anode material has a "bicontinuous structure", in which the two phases are interconnected in three dimensions, as illustrated in FIG. 3(b). In such a morphology, one continuous phase serves as an ionic conductor (YSZ) and the other continuous phase (Ni) serves both as catalyst and electronic conductor. S. Park, V. J. Vohs and R. J. Gorte in Science, 406, (2000), 265, have demonstrated that carbon formation is greatly suppressed by partial replacement of the Ni catalyst with Cu. However, since Cu is a poor catalyst for breaking the C—H and C—C bonds, compensating additions of another catalyst material, such as cerium oxide, are made to obtain reasonable hydrocarbon oxidation rates, as indicated by S. J. Park, V. J. Vohs and R. J. Gorte, Science, 406, (2000), 265; and by A. V. Virkar, J. Chen, C. W. Tanner and J. Kim, Solid State Ionics, 131, (2000), 189.

In summary, it is apparent that the use of nanostructured materials in SOFCs exerts a positive influence on cell performance. In terms of ionic transport, FIG. 4 shows the significant benefit derived from replacing conventional YSZ material with its nanostructured counterpart. Clearly, one would expect similar enhancements in the conductivity of other nanostructured oxide phases, such as $Ce_{0.9}Gd_{0.1}O_{1.95}$ and $La_{1-x}S_xCo_{1-y}Fe_yMnO_3$. Another benefit of nanostructured ceramics is the enhancement in catalytic properties as demonstrated in recent investigations using cerium oxide as catalyst. See, T. Hibino, A. Hashimotom, T. Inuoe, J. Tokuno, S. Yoshida and M. Sano, Science, 288, (2000), 2031; and E. P. Murray, T. Tsai and S. A. Barnett, Science, 400, (1999), 649. Beyond this, even greater performance enhancements are achievable using far-from-equilibrium processing methods to obtain high solute concentrations in supersaturated metastable states, preferably with nanograined or amorphous structures as depicted in FIG. 2.

Fundamental Aspects

Figure 5:
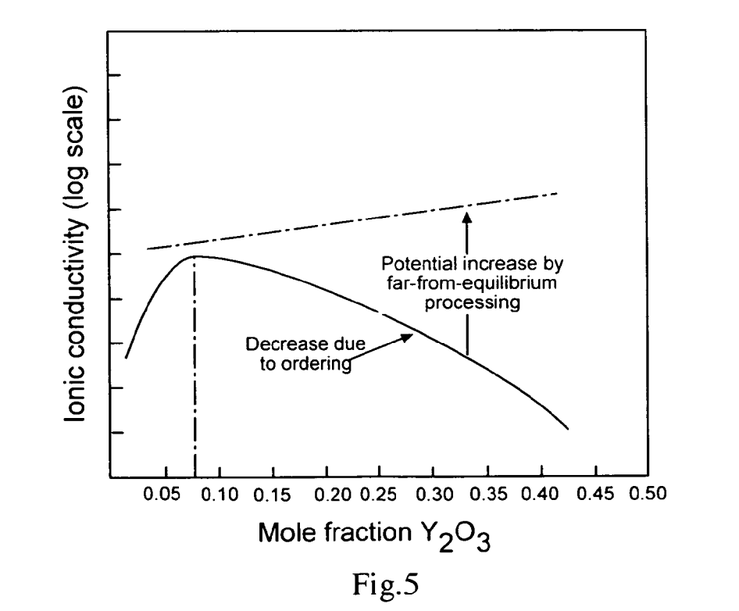
FIG. 5 is a graphic illustration showing the ionic conductivity of YSZ with increasing mol fraction of yttria as well as the potential increase that may be achievable by overcoming the severe limitations of vacancy ordering effects.

A characteristic of $ZrO_2$-base and other electrolyte materials is the role of dopants and defects in determining the ionic conductivity. FIG. 5 shows, for example, the large increase in ionic conductivity obtained with increasing addition of $Y_2O_3$: See V. V. Kharton, E. N. Naumovich, and A. A. Vecher in J. Solid State Electrochem. 3, 61 (1999), and V. V. Kharton A. A. Yaremchenko and E. N. Naumovich, ibidn 3, 303 (1999). This results from the creation of two oxygen-sublattice vacancies by substituting a trivalent yttrium ($Y^{3+}$) ion for a quadrivalent zirconium ($Zr^{4+}$) ion. As indicated, the ionic conductivity increases up to a maximum value for an yttria concentration of 8-12 mol percent. $Y_2O_3$. Beyond this, it exponentially decays due to vacancy ordering interactions. This invention is concerned with minimization of this deleterious effect by inhibiting vacancy ordering by rapid quenching processing from a homogeneous vapor or liquid state. At the same time, rapid quenching enables high concentrations of selected dopant species to introduce lattice strains that counteract the electrostatic interactions that promote ordering.

Guidance into the selection of compositions and processing conditions are provided by electronic structure calculations as set forth by A. Bogicevic, C. Wolverton, G. M. Crosbie and E. B. Stechel in Phys. Rev. 64, 014106 (2001). See also A. Bogicevic, and C. Wolverton, Phys. Rev. 67, 024106 (2003). This work on YSZ-base materials demonstrates the need to consider the electronic and elastic contributions to the formation enthalpies of compounds.

Figure 6:
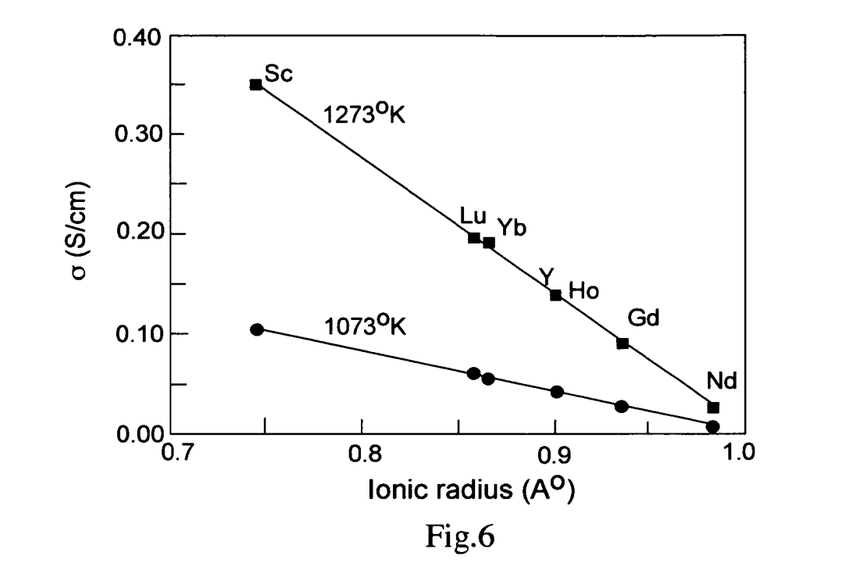
FIG. 6 as a graphic illustration of ionic conductivity vs ionic radius for a series of zirconia compounds doped with oxides of lanthanide elements.
Figure 7:
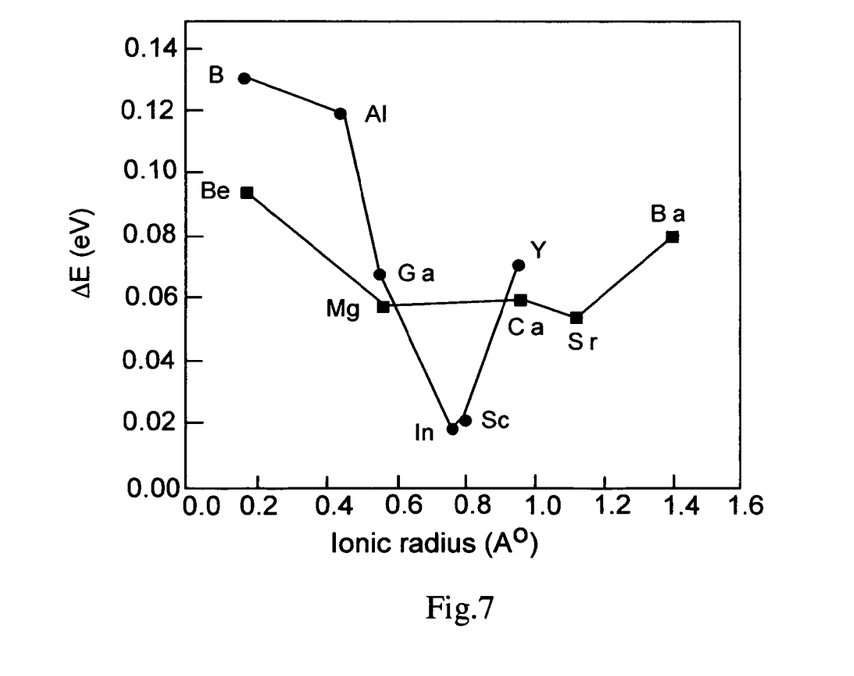
FIG. 7 is a graphic illustration of the maximum variation in the vacancy dopant binding energy with a separation increase from 1NN to 3NN for divalent and trivalent dopants in zirconia.

Overall, the analysis shows that defect ordering in YSZ is governed by vacancy-vacancy interactions, then by vacancy dopant interactions, and then by dopant interactions. Each ordering tendency is a balance between competing electrostatic and elastic forces within the structure. This concept has important consequences in terms of introducing dopants by materials processing, such as rapid quenching and post-annealing. In considering dopants, the approach to minimizing vacancy dopant interactions, which are deleterious to ionic conduction, is to introduce dopants whose induced elastic strain fields counteract electrostatic interactions. In this endeavor, it is instructive to gain some insight into potential effects by considering available experimental results. For example, V. V. Kharton, E. N. Naumovich, and A. A. Vecher in J. Solid State Electrochemistry, (1999) 3, 61-81 have shown that ionic conductivity monotonically increases with decreasing ionic radius, as shown in FIG. 6. Theoretical predictions of potential dopants are considered from the maximum variation of the vacancy dopant binding energy as the separation is increased from first nearest neighbor (1NN) to third nearest neighbor (3NN). This is shown in FIG. 7 for a number of divalent and trivalent dopants in $Zr_6Y_2O_{15}$, where the smallest binding energy variation is for dopants that are of comparable size to $Zr^{4+}$. It is of particular interest that $Sc_2O_3$-stabilized $ZrO_2$, which has one of the lowest binding variations, has the highest ionic conductivity of any known binary-doped $ZrO_2$. Other systems also observed to have a relatively high ionic conductivity ($Y_2O_3$- and CaO-doped) are calculated to have a relatively small vacancy dopant binding variation. Another interesting addition is $In_2O_3$, which is argued to be the preferred addition, since its calculated enthalpy is positive, whereas it is negative for CaO— and $Y_2O_3$-doped systems. This feature indicates that $In_2O_3$ is less susceptible to ordering tendencies, which degrade conductivity.

Quenching Effects

Figure 8A:
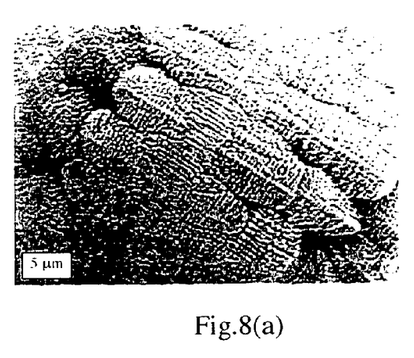
FIG. 8(a) is a SEM micrograph of water-quenched $Al_2O_3$-$13TiO_2$ particles with a dendritic structure which illustrates the effect of cooling rate.
Figure 8B:
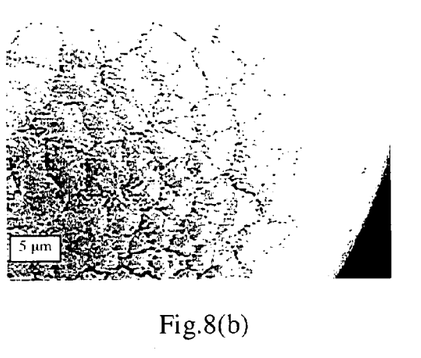
FIG. 8(b) is a SEM micrograph of water-quenched $Al_2O_3$-$13TiO_2$ particles with a cellular structure.

The microstructures produced by rapid solidification processing (melt-quenching) for metallic systems are summarized by M. Cohen, B. H. Kear and R. Mehrabian in Proc. $2^{nd}$ Int. Conf. on Rapid Solidification Process sing, Reston, Va., p. 1. Relatively little attention, however, has been devoted to ceramic systems. The inventor's SEM observations on melt-quenched ceramic particles in water or splat quenched particles show how the surface morphology reflects differences in solidification mode, (see FIG. 8).

Figure 9:
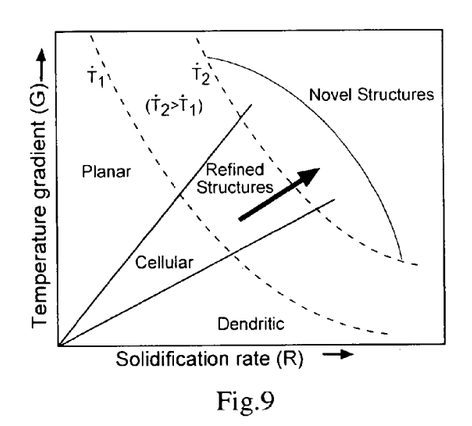
FIG. 9 graphically illustrates the relationship between temperature gradient and solidification rate for nanostructured materials formed under different conditions.
Figure 10:
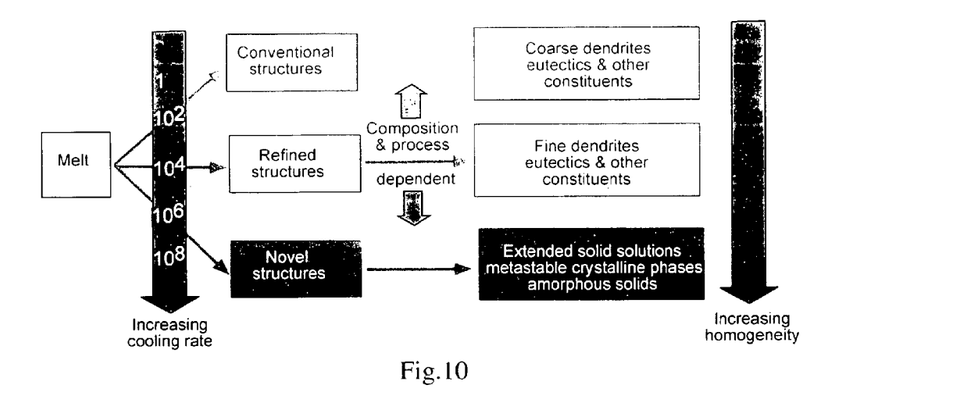
FIG. 10 diagrammatically illustrates the types of ceramic structures formed from a melt by cooling the melt at different rates.

As known by solidification theory, the solidification mode progressively changes from dendritic to cellular with increasing cooling rate. This is accompanied by a decrease in segregation, and finally to plane-front or segregation-less solidification as seen in FIG. 9. The latter can give rise to extended solid solutions, metastable crystalline phases or amorphous solids, depending on composition and cooling rate as seen in FIG. 10.

In this invention, metastable phases that contain high concentrations of specific dopants in supersaturated solid solution states are of primary interest. However, amorphous or nanograined materials are preferred, because the excess free volume in the former facilitates bulk diffusion, whereas the high density of grain boundaries in the latter promotes grain boundary diffusion. These effects are particularly important when the selected dopants introduce high concentrations of oxygen-sublattice vacancies, and where the tendency for defect ordering and clustering is minimized, as discussed above. In a given ceramic system, the susceptibility to amorphization or glass formation by rapid quenching increases with its compositional complexity. This so-called "confusion principle" of material design is particularly relevant to oxide ceramics, where additions of network formers, such as $SiO_2$, $GeO_2$ and $B_2O_3$, render most oxide ceramics susceptible to glass formation, even under moderate cooling rates. Hence, the use of such additives to promote amorphization of SOFC stack materials is another feature of this invention.

Melt-Quenching Method

Figure 11:
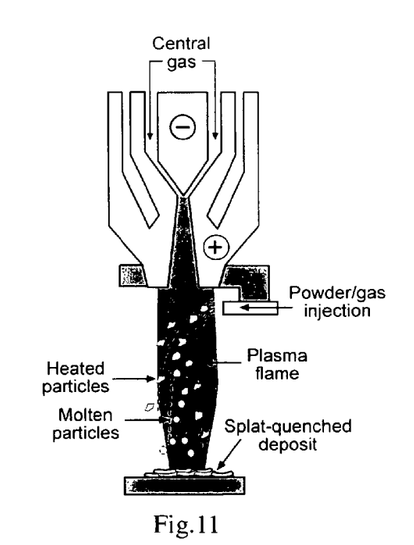
FIG. 11 schematically illustrates a deposited layer cooled by splat quenching and the generation of the plasma by using a lateral injection DC plasma torch.

One method to generate metastable ceramic deposits is by a DC-arc plasma process using fine-particle aggregates as feed material as seen in FIG. 11. The feed particles are injected laterally into the high enthalpy plasma, and, after melting and homogenization, rapidly quenched on a chilled substrate. As indicated, the deposited material is built up incrementally by the superposition of splat-quenched particulates. The calculated cooling rate for a feed particle diameter of 30-50 μm. is about $10^6$ K/s, which in most cases is sufficient to produce a metastable deposit. A feature of laterally injecting the powder into the plasma flame is that individual particles have different trajectories and therefore experience different thermal histories. Thus, a completely homogeneous deposit is not attainable in a single pass through the plasma.

Figure 12:
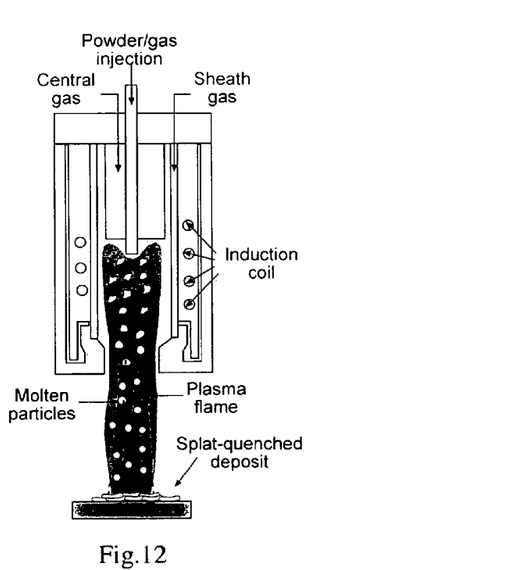
FIG. 12 is a similar illustration of the method using an axial injection RF plasma torch.

To overcome this difficulty, an RF-system with an axial powder delivery unit may be employed as shown in FIG. 12. Another innovation is a DC-arc plasma system similar to that shown in FIG. 11, except that the plasma flame is contained within a water-cooled tubular shroud. This system is effective in processing metastable deposits in a single melt-quenching treatment. When an amorphous or glassy structure is formed, the material is homogeneous down to molecular dimensions. On the other hand, when a fine-scale dendritic or cellular structure is formed, the scale of segregation is typically of sub-micron dimensions.

Both DC- and RF-plasma systems operate using conventional aggregated feed particles of 30-50 micron diameter. Optimal melt-homogenization however, is achieved using fine-particle aggregates composed of <0.5 micron constituent phase particles. This is because of the short distance for liquid state diffusion in the molten fine particles. Such melt-homogenization ensures a completely uniform melt-quenched powder product.

Vapor-Condensation Method

Figure 13:
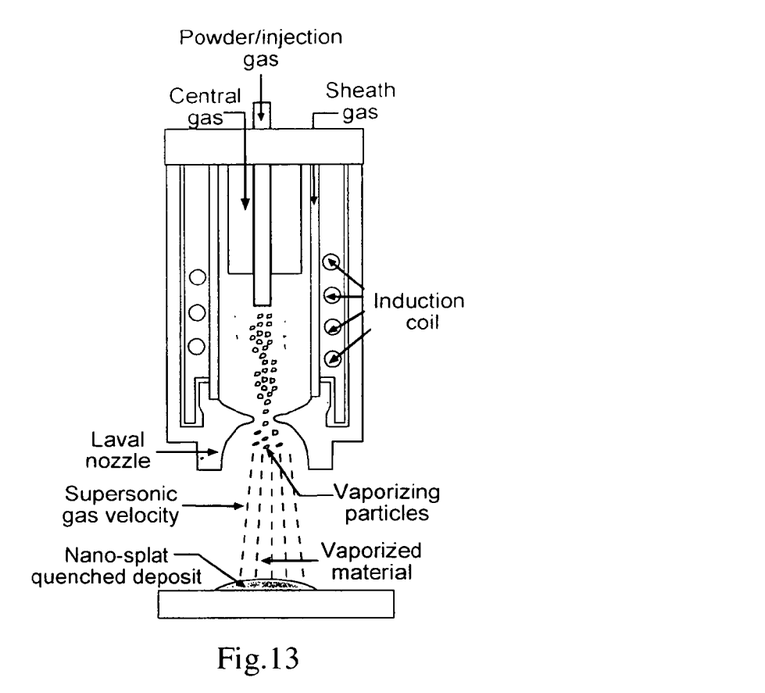
FIG. 13 is a similar illustration in which a schematic RF plasma spray apparatus with ultrasonic (Laval) nozzle vaporizes feed particles in which the deposited layer is formed by splat quenching nanoparticles condensed from the vapor.
Figure 14:
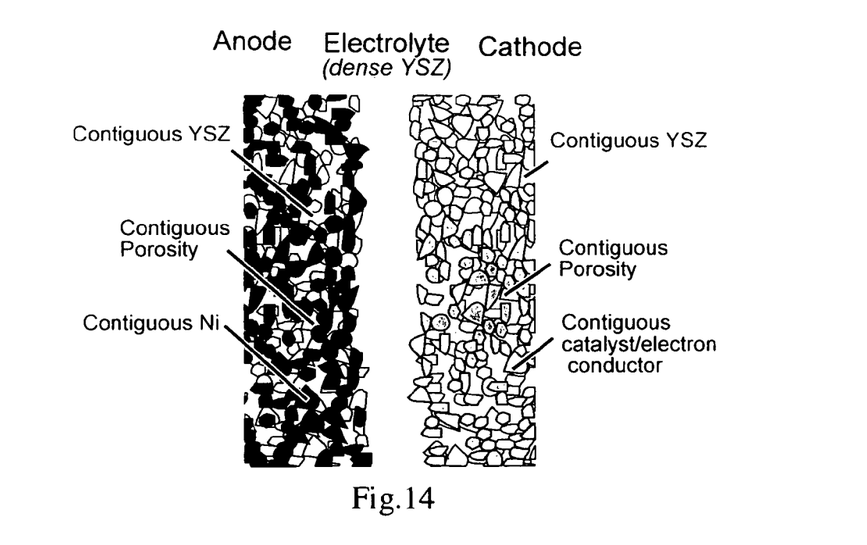
FIG. 14 schematically illustrates a solid oxide fuel cell structure with an electrode/electrolyte assembly in which the contiguous YSZ phase penetrates from the impervious electrolyte layer into the anode and cathode layers.

FIG. 13 schematically illustrates an RF-plasma process that is capable of efficiently vaporizing fine-particle aggregates due to an extended particle residence time in a high enthalpy flame. The resulting plasma contains a completely homogeneous mixture of the starting components, albeit in a highly ionized state. Following expansion through a supersonic nozzle, adiabatic cooling of the plasma results in prolific nucleation of nanoparticles by vapor condensation. Thus, when the superheated nanoparticles are directed onto a moderately heated substrate, in situ sintering occurs as fast as the particles arrive at the substrate surface, thus forming a dense metastable deposit. Calculations indicate that the effective cooling rate for splat-quenched nanoparticles of about 30 nm in size is $>10^7$ K/sec which ensures the formation of a metastable deposit.

In an adaptation of the preceding method, a shrouded DC-arc plasma system with a supersonic nozzle is used where the feed material is in the form of an aerosol dispersion of mixed salt solutions. In this case, feed particle pyrolysis, melting, vaporization, condensation and deposition occurs in a single cost-effective spray deposition operation. Details of this process are described in a separate patent application.

An advantage of the vapor-condensation method compared with the melt-quenching method, is that the metastable deposit is produced by in-situ sintering of a very large number of splat-quenched nano-particulates. This facilitates the fabrication of thin (10-15 micron) impervious nanostructured or amorphous deposit. This is important for the case of an electrolyte material where minimal thickness combined with impermeability is a critical requirement.

Manufacture of Multi-Layer Nanostructured and Amorphorus Products

In an electrolyte/electrode layer assembly, a preferred material fabrication feature is a continuous three dimensional YSZ network extending from the electrolyte into the adjacent anode and cathode electrodes. The desirability of this has been pointed out by C. W. Tanner, K. Z. Fung and A. V. Virkar in J. Electrochemical Soc. 144 (1) 21 (1997). As illustrated in FIG. 13, a contiguous YSZ phase in both the Ni—YSZ anode and LSM-YSZ cathode composite structures extends from the impervious YSZ electrolyte layer. This morphology ensures efficient transport of $O^{2-}$ ions through the stack. Thus, at the porous anode, the gaseous products of Ni-catalyzed decomposition of the hydrocarbon fuel are oxidized over the entire thickness of the anode layer. Similarly, at the porous cathode, the high surface area LSM phase reduces the incoming oxygen and delivers the $O^{2-}$ ions to the contiguous YSZ phase, and hence, through the impervious YSZ electrolyte layer, to the porous Ni—YSZ anode, where oxidation of the fuel decomposition products occurs.

Such a functionally graded SOFC stack is readily fabricated by DC- or RF-plasma spray deposition technology by making appropriate adjustments to critical spray parameters, such as torch power, powder feed rate, and nozzle/substrate stand-off distance. To deposit the electrolyte layer, for example, a small stand-off distance ensures that all the particles are fully molten prior to impact on the substrate, thus forming a 98-99% dense layer. On the other hand, to deposit the porous electrode layers, the stand-off distance is increased so that some fraction of the molten particles experience solidification prior to deposition on the substrate, thus forming an incompletely densified layer that contains significant open porosity.

System Design and Manufacture

An important feature of the invention is the use of sequential plasma spray deposition to fabricate directly SOFC stack materials with desired metastable structures. This eliminates the need for high temperature processing of stack materials, as is typically employed in most SOFC fabrication procedures. Another feature is the ability to form electrode layers directly on metal interconnects and plenums at near ambient temperatures; this affords considerable flexibility in the choice of metal substrates, e.g., stainless steel instead of more heat-resistant alloys. In the manufacture of such metal supported SOFCs, masking techniques are used to apply patterned ceramic electrodes to the metal substrates.

An integrated process for the fabrication of a planar SOFC stack by the processing methodology described above is illustrated schematically in FIG. 15. The sequence of processing steps involves spray deposition of: (1) a thick porous anode layer; (2) a thin (10-15 µm) impervious electrolyte layer; and (3) a thick porous cathode layer. This anode-supported design may also incorporate a carbon or metal fiber fabric onto which the anode material is spray deposited. The fabric provides good electrical connection while facilitating easy passage of gaseous reactants.

The processing route described herein may be used to fabricate SOFCs of planar, radial, or tubular design. SOFC stack assemblies that can be made in accordance with the invention are shown in FIGS. 16(a)-16(d). Quality control of electrode and electrolyte layers is maintained by mass flow controllers that regulate gas and powder delivery to the DC- or RF-plasma torches. In an integrated manufacturing process, such as that depicted in FIG. 16(a) for a planar SOFC stack, a micro-processor controls the relative motion of each torch with respect to the moving substrate, as well as the critical stand-off distance between torch nozzle and substrate surface. Thus, it is possible to attain complete control of thickness and density of electrode and electrolyte layers, as well as the grading of the interfaces between them. This methodology provides the basis for the high volume production of SOFC stacks by an automated manufacturing process.

The versatility and applicability of this invention will become more apparent when the following examples are considered.

Processing of Metastable Electrolyte Materials

This invention utilizes rapid quenching of multi-component oxide ceramics to generate novel metastable structures and properties, using dopants to inhibit ordering and clustering effects. To modify ionic conductivity properties of YSZ-base materials, for example, dopant elements may be introduced in concentrations well above the equilibrium values. The dopant may be an oxide of the lanthanide group (Ce, Tb and Er) or other oxides selected from the group consisting of $Y_2O_3$, $Sc_2O_3$, $B_2O_3$, $Al_2O_3$, $Ga_2O_3$, $In_2O_3$, BeO, MgO, CaO, SrO, BaO, $Bi_2O_3$ and $RuO_2$. The plasma spray methodology described in this invention also provides the means to introduce random distributions of oxygen ion vacancies by selective vaporization of one or more of the constituent phases. Evidence for this is provided in Example 6 below.

Another aspect of the invention is the fabrication of nanostructured or amorphous SOFC materials by rapid quenching. Evidence for this is provided by SEM micrographs of nanostructured biphasic and triphasic YSZ-base materials as seen in Examples 1-3 below. This methodology facilitates intimate blending (on the nanoscale) of two or more ionic or mixed conductor materials. The potential advantage of composite electrodes formed by conventional processing of ceramic materials has been discussed by B. C. H. Steele, K. M. Hori, and S. Uchino in Solid State Ionics 135 (2000) 445. In contrast, this invention provides the means to obtain enhanced properties by nanoscale blending of electrode and electrolyte materials. Such properties include increased catalytic activity and charge transfer between electrode and electrolyte materials by virtue of the very high interfacial area. In SOFC operation, an advantage of a multi-phase nanostructure over a single phase nanostructure is increased resistance to grain coarsening. A potential use of multi-phasic nanostructures is in the design of specific properties, such as thermal expansion coefficient where predicted properties can be obtained by assuming a "rule of mixtures."

A generalized methodology for rapid-quench processing of SOFC electrode and electrolyte materials is illustrated by the processing of YSZ-base materials. In this procedure, starting powders of YSZ and an additive oxide phase are mixed in the desired proportions by wet milling, using ethanol as dispersant. After adding a boehmite binder phase, the slurry is spray-dried to form spherical particle aggregates, about 30-50 µm dia. The spray-dried powder is heat-treated at 900° C. to remove all traces of the binder phase, and then partially sintered at 1200° C. to ensure that the aggregated feed particles remain intact during plasma processing. Both water quenching and splat quenching of aggregated feed particles are conducted using the procedures shown schematically in FIGS. 11-13. A working gas mixture of Ar+10% $H_2$ is delivered to the torch at a pressure of 50-75 psi. The argon carrier gas used to feed the powder is at a pressure of 60 psi.

In a typical splat-quenching treatment, the plasma torch is operated at 60 kW, and the powder is delivered to the plasma at a feed rate of 60 g/min. Other critical spray parameters are listed in Table One.

TABLE ONE

Plasma Spraying Parameters Used For
Water Quenching And Splat Quenching

| Plasma Spray Conditions | Data |
|---|---|
| Current (A) | 600 |
| Voltage (V) | 100 |
| Primary gass-Ar flow rate (SCFH)* | 90 |
| Carrier gass-Ar flow rate (SCFH)* | 10 |
| Powder feed rate (g/min) | 60 |
| Stand off distance for water quenching (cm) | 30 |
| Stand off distance for splat quenching (cm) | 10 |

*SCFH: standard cubic feet per hour

In another approach, a fine particle aerosol of mixed salts of the precursor materials is also used as feed material in plasma processing. After pressure atomization of a homogeneous liquid solution, a carrier gas delivers the aerosol particles to the shrouded DC arc-plasma reactor, as discussed previously.

Example 1

Spray Deposition of YSZ-20% $Al_2O_3$ Composition

Figure 17:
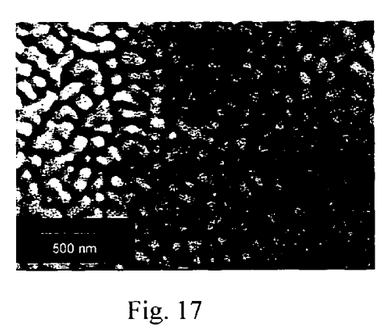
FIG. 17 is a FESEM micrograph of water-quenched YSZ—$Al_2O_3$ showing a segregated $ZrO_2$-rich cellular structure.
Figure 18:
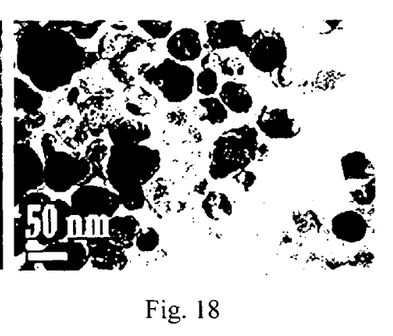
FIG. 18 is a HRTEM micrograph of splat-quenched YSZ-$20Al_2O_3$ showing a nanoscaled dispersion of $ZrO_2$-rich particles in an $Al_2O_3$-rich matrix phase.
Figure 19:
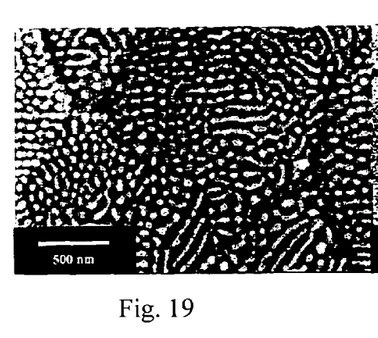
FIG. 19 is a FESEM micrograph of water-quenched YSZ-$57A_2O_3$ (eutectic composition) coarse particles.

Water quenched particles have a segregated cellular structure, with tetragonal-$ZrO_2$ rich cores and $\delta$-$Al_2O_3$ rich interstices as seen in FIG. 17. Cooling at a higher rate by splat quenching produces a more homogeneous structure. The amount of cubic $ZrO_2$ phase decreased with increasing deposit thickness due to reduced heat transfer, but it was still evident in a thick deposit. Following heat treatment at temperatures less than <1200° C., the metastable material decomposed to form a fine scale composite structure, consisting of a 30 vol. percent dispersion of $\alpha$-$A_2O_3$ particles in a t-$ZrO_2$ matrix as seen in FIG. 18.

Example 2

Spray Deposition of YSZ-57% $Al_2O_3$ Composition

Figure 20:
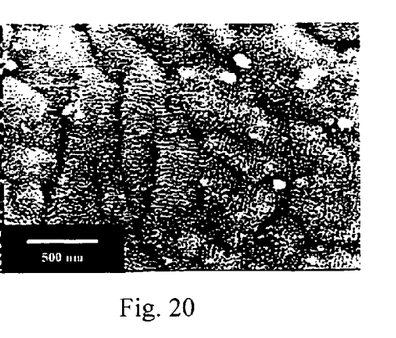
FIG. 20 is a FESEM micrograph of water-quenched YSZ-$57A_2O_3$ (eutectic composition) fine particles showing refinement of eutectic structure due to an increased cooling rate.
Figure 21A:
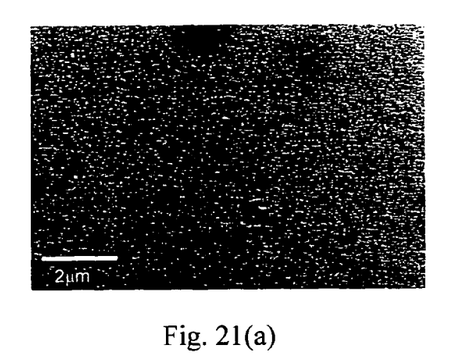
FIG. 21(a) is a FESEM micrograph of water-quenched YSZ-$27A_2O_3$-$22MgAl_2O_4$ powder after heat treatment at 1200° C.
Figure 21B:
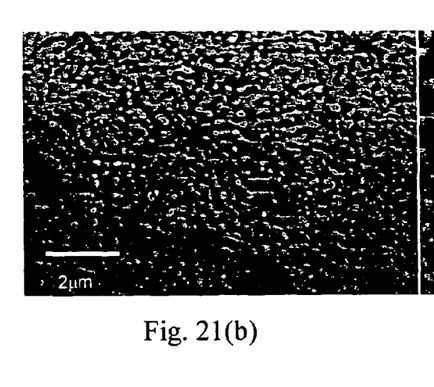
FIG. 21(b) is a FESEM micrograph of water-quenched YSZ-$27A_2O_3$-$22MgAl_2O_4$ powder after heat treatment at 1400° C.
Figure 21C:
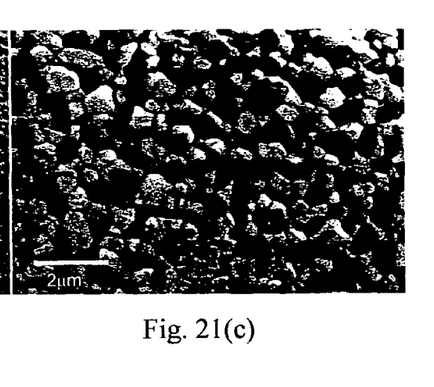
FIG. 21(c) is a FESEM micrograph of water-quenched YSZ-$27Al_2O_3$-$22MgAl_2O_4$ powder after heat treatment at 1600° C.

Water quenched particles had a refined eutectic structure, consisting of a high fraction of t-$ZrO_2$ fibers in a $\delta$-$A_2O_3$ matrix as seen in FIG. 20. More rapidly cooled small particles displayed an even finer eutectic structure as seen in FIG. 21(a), FIG. 21(b), and FIG. 21(c). Rapid cooling by splat quenching promoted retention of the amorphous state, with increased crystallinity accompanying increased thickness due to the decreased cooling rate. Decomposition of the metastable material at temperatures greater than 1200° C. generated a biphasic composite of $\alpha$-$Al_2O_3$+t-$ZrO_2$ phases.

Example 3

Spray Deposition of YSZ-27% $Al_2O_3$-22% $MgAl_2O_4$, Composition

Water-quenched particles showed no visible surface features, consistent with plane-front or segregation-less solidification as seen in FIG. 21(a). X-ray diffraction analysis confirmed the presence of a t-$ZrO_2$ extended solid solution phase. Phase decomposition by heat treatment at 1400° C. generated a triphasic nanocomposite of t-$ZrO_2$, $\alpha$-$Al_2O_3$ and spinel-$MgA_2O_4$ phases as seen in FIG. 21(b). Significant coarsening of this composite structure occurred upon heat treatment at 1600° C. as seen in FIG. 21(c).

Example 4

Thermal Treatment of YSZ-base Compositions

Heat treatment of metastable YSZ-base compositions at intermediate temperatures (~1050° C.) invariably resulted in the appearance of metastable intermediate phases, with one-, two- or three-phase nanostructures. These morphologies were retained over extended periods without significant coarsening or modification.

Example 5

Spray Deposition of Doped-YSZ Compositions

Splat quenched particles of YSZ-base compositions typically had homogeneous metastable structures consisting of retained cubic-$ZrO_2$. A similar effect was observed in a variety of RE-doped oxide YSZ-base materials. This same methodology may be applied to YSZ-base compositions that contain significant additions of lanthanide group oxides (Ce, Tb and Er) and other oxides selected from the group of $Sc_2O_3$, $B_2O_3$, $Al_2O_3$, $Ga_2O_3$, $In_2O_3$, BeO, Mgo, CaO, SrO, BaO, $Bi_2O_3$ and $RuO_2$.

Example 6

Spray Deposition of Non-Stoichiometric YSZ-Base Compositions

Metastable phases that are oxygen-deficient were initially observed in a melt-quenched $Al_2O_3$/13$TiO_2$ composition. The formation of a defect spinel structure was accompanied by a color change which was reversed by heating in air at 1100° C. Moreover, phase decomposition induced by heat treatment developed metastable intermediate and equilibrium $\alpha$-$Al_2O_3$+rutile-$TiO_2$ nanocomposte structures. Similar behavior was observed in melt-quenched YSZ-base compositions, particularly for smaller particles that were exposed to higher temperatures, and hence with a greater propensity for loss of volatile species. The introduction of oxygen-ion vacancies by selective vaporization during plasma processing is another feature of this invention, because of the role of such vacancies in controlling ionic conduction.

Processing of Metastable Anode Materials

The criterion for a Ni—YSZ anode material is sufficient Ni (~50 vol. %) to provide efficient catalytic decomposition of the hydrocarbon fuel and continuous electrical connection. Preferably, the porous anode material should have a bicontinuous nanostructure as depicted in FIG. 2(b). This provides a high density of reaction sites with associated pathways for the ingress of reactants and egress of decomposition products. The YSZ phase provides a steady supply of $O^{2-}$ ions, which react with the hydrocarbon fuel to form $CO_2$ and $H_2O$ that are vented from the system.

Example 7

Spray Deposition of Ni—YSZ

Powders of NiO and YSZ are processed by wet milling, spray drying and heat treatment followed by plasma spraying into water. During DC- or RF-plasma deposition, the stand-off distance was progressively reduced to form a graded porous structure. The deposited material was then heated in flowing $H_2$ at 500° C. to reduce the NiO component to high surface area Ni. In another procedure, the aggregated NiO and YSZ powder was processed in a high enthalpy plasma reactor employing a supersonic nozzle. Following adiabatic expansion in a reductive atmosphere, the partially melted aggregated particles were deposited as a Ni/YSZ porous nanocomposite.

Processing of Metastable Cathode Materials

The objective in enhancing cathode composites, such as LSM/YSZ, is to achieve a synergism between the properties of the electronic and electrolyte phases for profuse oxygen injection into the electrolyte phase. In a nanocomposite, this is facilitated by (i) enhanced catalytic activity, and (ii) the high electrode/electrolyte interfacial area. In forming such a nanocomposite by plasma processing, it is necessary to avoid formation of a highly resistive pyrochlore phase, $La_2Zr_2O_7$. Since this precludes plasma processing of an LSM/YSZ powder mixture, a twin powder feed system was used. By this method a porous composite structure was deposited.

Example 8

Spray Deposition of $La_{0.8}Sr_{0.2}MnO_{3-\delta}$—YSZ

Starting powders of $La_2O_3$, SrO and $MnO_2$ were processed by wet milling, spray drying and heat treatment. The mixed powders were then melted in a high enthalpy DC- or RF-plasma torch and water quenched to obtain a metastable LSM powder. Quite independently, a similar melt-quenching treatment was used to produce a metastable YSZ-base powder. Finally, the two types of powder were co-sprayed, using a twin powder feed system, to obtain the desired porous LSM+YSZ cathode material and controlling the stand-off distance to obtain the desired graded-porous structure.

Relatively rapid production of the fuel cell stack can be effected by passing the substrate through three stations at which there is sprayed thereonto a plasma of the desired composition and structural characteristics. Alternatively, the substrate can be stationary at a work station, and three plasma units moved sequentially thereover to deposit the several layers. Still another option is to use a fixed plasma spray unit at a stationary work station and to alter the feed thereto. The chilling of the substrate and of the layer being deposited thereon can be effected by various techniques including internal water or refrigerant cooling, cold air, etc.

Although a continuous deposition process on a substrate is preferable, it is possible to preform the anode or cathode layer which then becomes the substrate for deposition of the electrolyte layer and the other of the anode or cathode layers. The ceramic stack can be removed from the substrate or the substrate may be integrated into the final fuel cell assembly.

Figure 15A:
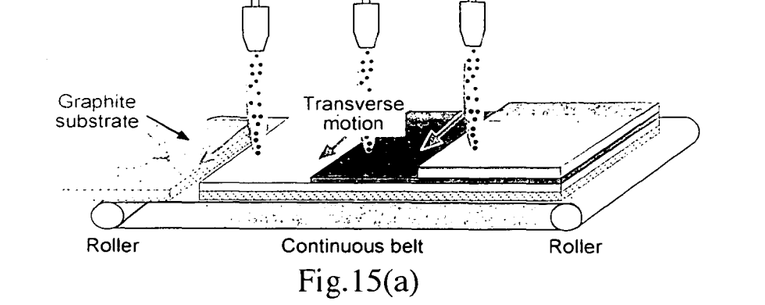
FIG. 15(a) schematically shows a continuous plasma spray deposition installation to produce a stack according to the present invention.
Figure 15B:
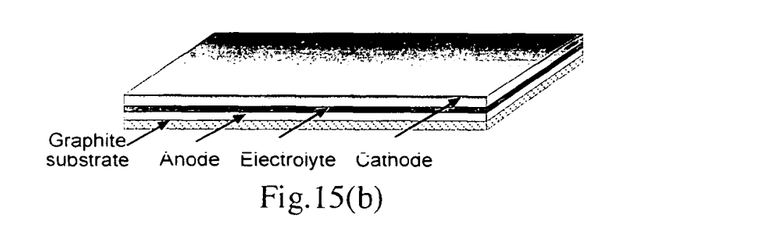
FIG. 15(b) schematically illustrates the solid oxide fuel cell manufactured by the installation shown in FIG. 15(a)
Figure 16:
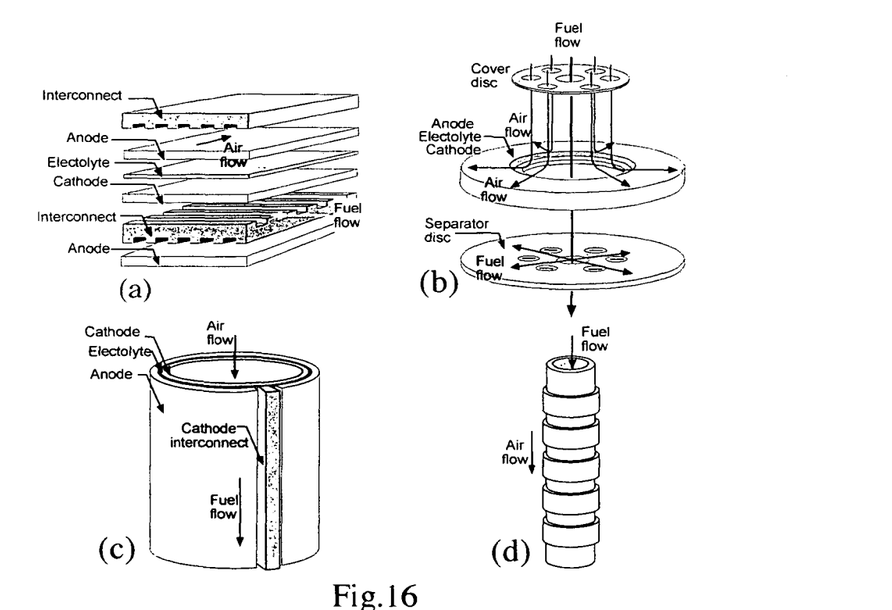
FIG. 16(a)-(d) show different solid oxide fuel cell stack assemblies which can be manufactured in accordance with the method of the present invention.

The preferred embodiment of the present invention transports a graphite substrate past three plasma spray deposition torches to sequentially deposit the anode, electrolyte, and cathode layers as depicted in FIG. 15 using processing parameters given in Table One.

The first torch deposits a nanostructured YSZ—Ni (~50 vol. %) anode electrode layer of 30-100 microns thickness, having an interconnected porous (or nanoporous) structure of 15-20 volume % of the anode layer. The interconnected nickel nanoparticle network throughout the anode layer facilitates catalytic reaction of oxygen ions and the hydrocarbon fuel, and provides an electronic conduction path. The interconnected YSZ nanoparticle network facilitates conduction of oxygen ions arriving from the YSZ electrolyte throughout the anode. The YSZ—Ni anode layer is formed by plasma spraying a YSZ—NiO powder that was prepared by wet milling, spray drying and heat treatment followed by spraying into water. During the plasma DC- or RF-plasma spray deposition, an increased stand-off distance is maintained to ensure formation of a porous structure. The aggregated NiO and YSZ powder are processed in a high enthalpy plasma torch using a supersonic nozzle. Following adiabatic expansion in a reductive atmosphere of hydrogen, the partially melted aggregated particles are deposited to form the Ni—YSZ porous nanocomposite anode layer.

The feed to the second torch progressively reduces the Ni content in the YSZ—Ni powder feed as the stand-off distance is simultaneous reduced. This produces a transition structure between the YSZ—Ni anode and a dense (98-99%) YSZ electrolyte layer. This plasma deposition of dense YSZ is continued until there is a 10-30 micron thick electrolyte layer.

The third torch uses a feed in which the amount of $La_{0.8}Sr_{0.2}MnO_{3-\delta}$ (LSM) preprocessed powder is introduced into the YSZ powder feed and is increased with a simultaneous increase in the stand-off distance. This produces a transition structure between the dense YSZ electrolyte and a porous $La_{0.8}Sr_{0.2}MnO_{3-\delta}$—YSZ cathode layer of 30-100 microns thickness. The starting powders of $La_2O_3$, SrO and $MnO_2$ are processed by wet milling, spray drying and heat treatment. The mixed powders are then melted in a DC- or RF-plasma torch and water-quenched to obtain a metastable LSM powder which is added to the YSZ feed. The nanocomposite LSM-YSZ cathode structure is comprised of a continuous LSM phase for electronic conduction and a continuous YSZ phase for electronic conduction.

The multilayer strip thus produced is in a form suitable for fabrication into a SOFC stack assembly which incorporates stainless steel, nimonic, or electronic conducting ceramic oxide interconnects.

From the foregoing detailed description and drawings, it can be seen that the novel method of the present invention produces novel nanostructured or amorphous ceramic solid oxide fuel cell stacks with improved oxygen ion transport and increased electron activity characteristics. The fuel cells comprise several layers with desirable far-from-equilibrium metastable structures and can be produced rapidly and relatively economically and which t improved efficiency.

Having thus described the invention, what is claimed is:

1. A solid oxide fuel cell having anode, cathode and electrolyte layers each formed essentially of a multi-oxide ceramic material, each of said layers having a structure selected from the group consisting of nanocrystalline, nanocomposite and amorphous, each of said structures being a far-from-equilibrium metastable structure, said electrolyte layer having a matrix of said ceramic material and a dopant dispersed therein in an amount substantially greater than its equilibrium solubility in said ceramic matrix to form the metastable structure, said electrolyte layer being impervious and serving as a fast oxygen ion conductor.

2. A solid oxide fuel cell in accordance with claim 1 wherein the multi-oxide ceramic material of said electrolyte layer is yttria-stabilized zirconia, and wherein the matrix has dispersed therein at least one dopant.

3. A solid oxide fuel cell in accordance with claim 1 wherein said structure of said electrolyte layer is amorphous.

4. A solid oxide fuel cell in accordance with claim 1 wherein said structure of such electrolyte layer is nanocrystalline.

5. A solid oxide fuel cell in accordance with claim 1 wherein said structure of such electrolyte layer minimizes (i) vacancy-vacancy, (ii) vacancy dopant, and (iii) dopant-dopant ordering to minimize restriction of oxygen ion mobility.

6. A solid oxide fuel cell in accordance with claim 5 wherein said dopant introduces elastic strain to counteract electrostatically-induced ordering.

7. A solid oxide fuel cell in accordance with claim 1 wherein said anode layer is porous.

8. A solid oxide fuel cell in accordance with claim 1 wherein said anode layer includes a continuous surface area metallic phase in which electron conduction is provided by said metallic phase and said multi-oxide ceramic matrix provides ionic conduction.

9. A solid oxide fuel cell in accordance with claim 8 wherein said structure of said metallic phase is nanocrystalline.

10. A solid oxide fuel cell in accordance with claim 7 wherein said structure of said multi-oxide ceramic matrix is nanocrystalline.

11. A solid oxide fuel cell in accordance with claim 8 wherein said structure of said multi-oxide ceramic matrix is amorphous.

12. A solid oxide fuel cell in accordance with claim 7 wherein said cathode layer is porous and comprises a multi-oxide ceramic material which provides mixed ionic and electron conduction.

13. A solid oxide fuel cell in accordance with claim 12 wherein said porous cathode layer is a composite structure in which one multi-oxide continuous ceramic phase provides electron conduction and another multi-oxide continuous ceramic phase provides ionic conduction.

14. A solid oxide fuel cell in accordance with claim 1 wherein said electrolyte layer defines a contiguous YSZ phase and has a graded interface with said anode and cathode layers, said graded interface comprising a nanoscale blending and penetration of said contiguous YSZ phase into said anode and cathode layers.

15. A solid oxide fuel cell in accordance with claim 1 wherein both of said anode and cathode layers are porous to permit diffusion.

16. A solid oxide fuel cell in accordance with claim 15 wherein the porosity is nano-porosity.

* * * * *